United States Patent [19]

Moran et al.

[11] Patent Number: 5,516,388
[45] Date of Patent: May 14, 1996

[54] SOL-GEL BONDING

[75] Inventors: Mark B. Moran; Linda F. Johnson, both of Ridgecrest, Calif.

[73] Assignee: The United States of America as represented by the Secretary of the Navy, Washington, D.C.

[21] Appl. No.: 300,243

[22] Filed: Sep. 11, 1994

[51] Int. Cl.⁶ .............................. B32B 31/12; B32B 31/26
[52] U.S. Cl. .................. 156/89; 156/230; 264/60
[58] Field of Search .......................... 156/89, 230, 233, 156/247; 264/60

[56] References Cited

U.S. PATENT DOCUMENTS

| | | | |
|---|---|---|---|
| 3,544,405 | 12/1970 | Nakai et al. | 156/164 |
| 4,072,782 | 2/1978 | Kramer et al. | 428/409 |
| 4,907,846 | 3/1990 | Tustison et al. | 350/1.6 |
| 4,978,410 | 12/1990 | Clark et al. | 156/89 X |
| 5,190,610 | 3/1993 | Ek | 156/89 |
| 5,215,942 | 6/1993 | MacKenzie et al. | 501/12 |

FOREIGN PATENT DOCUMENTS 63-256574  10/1988  Japan .
1-137411   5/1989   Japan .

OTHER PUBLICATIONS

S. Reed and C. Ashley; "Sol–Gel Protective Films For Metal Solar Mirrors" pp. 631–634, and C. Ashley, S. Reed and A. Mahoney; "Planarization of Metal Substrates For Solar Mirrors", pp. 635–638; *Better Ceramics Through Chemistry III;* Materials Research Society, Pittsburg, 1988.
C. J. Brinker and G. W. Scherer; "Optical Coatings", Electronic Films, and Protective Films, pp. 841–852; Sol–Gel Science; Academic Press, Inc. San Diego, 1990.

*Primary Examiner*—David A. Simmons
*Assistant Examiner*—M. Curtis Mayes
*Attorney, Agent, or Firm*—Stephen J. Church; Melvin J. Sliwka; John L. Forrest, Jr.

[57] ABSTRACT

Preexisting elements are bonded by placing a sol-gel solution between juxtapositioned surfaces of the elements and sintering a gel formed from the solution at a temperature, which does not damage the elements, to form a sol-gel derived bonding material. The elements may be constructed of glasses, metals, infrared transmissive materials, or diamond, and bonded by sintering at about 300° C. The bonding material may be resistant to high temperature and may have properties, such as refractive index, selected by varying the composition of the sol-gel solution. Optical and electronic articles are constructed by preparing a mandrel conforming to a substrate, which may be of arbitrary shape; depositing a coating on the mandrel; bonding the coating to the substrate with a sintered sol-gel; and removing the mandrel, as by etching. Diamond films formed by chemical vapor deposition at temperatures destructive to optical and microelectronic materials are thus mounted on variously shaped elements of these materials for protection against erosion and high temperatures and to provide low friction and high thermal conduction. Tetraethyl orthosilicate used as a sol-gel precursor gives a silica bonding layer effective at up to 800° C. Other precursors may be used, and a titania sol-gel precursor provides a matching index of refraction for zinc sulfide or zinc selenide substrates. An intermediate layer, as of sputter deposited metal selected to accommodate thermal expansion differences, may be disposed between an element to be bonded and the bonding material.

23 Claims, 2 Drawing Sheets

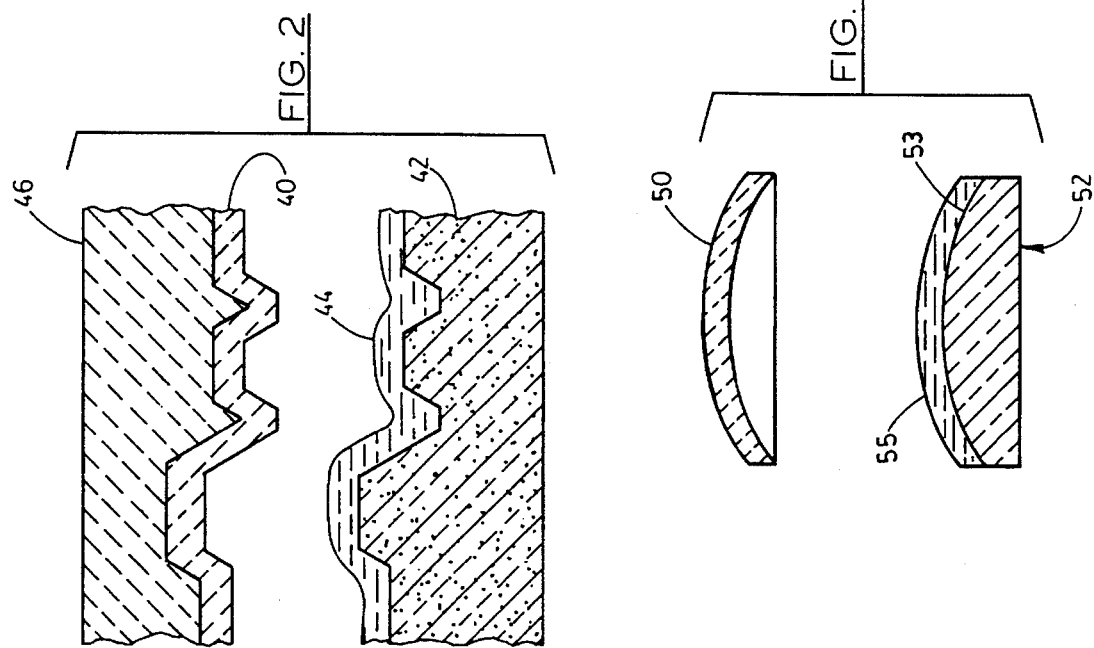
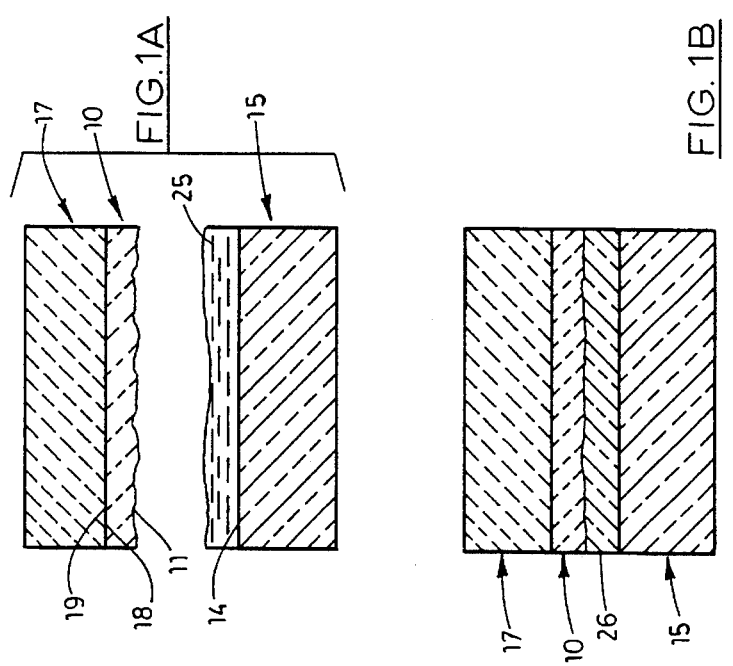

SOL-GEL BONDING

BACKGROUND OF THE INVENTION

1. Field of the Invention

This invention pertains to surface bonding using a sol-gel and, in particular, to such bonding with a preshaped lamina to produce an electrical or optical product.

2. Description of the Prior Art

Bonding materials are commonly used to construct an article by adhering elements thereof. It is thus possible to combine elements formed by incompatible methods. However, a material suitable for bonding may not withstand the operating environment of the completed article or subsequent steps in manufacture, or may interfere with operation of the article, as when used between elements of an optically transmissive article. Also, it may be desired to construct an article of a material, such as diamond, which has many advantageous properties but to which "nothing sticks".

In particular, it is desirable to provide diamond as a temperature and impact resistive coating for optical articles, as a protective and yet heat conductive coating for electronic devices, and as a low friction coating. The development of chemical vapor deposition (CVD) for diamond would appear to make these uses of diamond practical; however, the temperature and other conditions for CVD are highly destructive to most materials and, particularly, to optical materials typically used in the infrared and to materials used for semiconductor circuits. Heretofore and in general, it has not been possible to adhere diamond to other materials for use in many environments. For example, chalcogenide glasses have been used to "braze" diamond as a protective coating to zinc sulfide or selenide; however, these glasses typically soften at about 230° C. although thermal expansion differences between the other materials would permit their use together to 600°–800° C.

Similarly and insofar as known to the applicants, the prior art provides no way to attach a layer of a material such as diamond to a metal element, such as a fuselage, for use as a window subject to impact and aerodynamic heating; to provide a well-adhered and protective layer of such a material for a surface, as of an integrated circuit or other electronic device, having an arbitrary configuration, operating at temperatures of several hundred degrees Celsius and, therefore, advantageously provided with a highly thermally conductive mounting; or to provide a low friction layer of such a material for a variety of surfaces. It would thus be highly desirable to provide a method for adhering diamond and other substances to a material such as—but not limited to—glasses, ceramics, metals and metaloids and their oxides, nitrides, and the like that does not damage the material and is effective over a wide range of environmental conditions.

SUMMARY AND OBJECTS OF THE INVENTION

In accordance with a method embodying the present invention, preexisting elements are bonded by placing a sol-gel solution between surfaces of the elements and then sintering a gel formed from the solution at a temperature, which does not damage the elements, to form a sol-gel derived bonding material. The solution may be selected to include a sol-gel precursor for a bonding material resistant to high temperature and having desirable optical properties. The bonding material properties may be selected by varying the composition of the sol-gel solution. The method bonds other materials to diamond by sintering at a temperature not greater than about 300° C., and the use in the solution of a sol-gel precursor including a carbide forming element is effective with such sintering.

Optical and electronic articles are constructed in accordance with the method by the steps of preparing a separate mandrel conforming to a substrate, which may be of arbitrary shape; depositing a coating on the mandrel; bonding the coating to the substrate with such a sintered sol-gel; and removing the mandrel, as by etching. The substrate may be a transmissive body of an optical element or a functional portion of an electronic element, and may have various and arbitrary shapes. By the method, diamond films, which are formed by chemical vapor deposition at the necessary temperatures of up to 1100° C. destructive to optical and microelectronic materials, are conveniently mounted on variously shaped elements of these materials to protect the elements against erosion and high temperatures, to provide the elements with low friction surfaces, and to provide high thermal conduction from the elements. The method is effective to bond a metal surface, such as a layer deposited by sputtering, to a similar or other surface, and such a layer of a material selected to accommodate thermal expansion differences may be disposed between an element to be bonded and the sol-gel derived bonding material.

A sol-gel solution using tetraethyl orthosilicate gives a silica bonding layer effective at up to 600° to 800° C. For an optical article used in the infrared, the substrate may be zinc sulfide or zinc selenide and a sol-gel precursor for titania used to provide a matching index of refraction. Other silica sol-gel precursors may be used; and the index of refraction of the bonding layer may be selected by varying the composition, such as the water content, of the sol-gel solution.

It is an object of the present invention to provide articles constructed using a bond provided by a layer formed from a sol-gel.

Another object is to provide such a bond which is formed at a relatively low first temperature and yet is effective at a second and substantially higher temperature.

Still another object is to provide such a bond for a coating, which requires formation at a third temperature higher than such second temperature, to a substrate effective in optical and electronic elements constructed of a material damaged by said third temperature.

A particular object is to provide such a bond for diamond, including diamond films.

A further object is to provide such a bond for a coating formed on a separate mandrel conforming to such a substrate of arbitrary shape.

A still further object is to provide such an article wherein such a bond is formed by a layer having selectable optical properties including the index of refraction.

Yet another object is to provide such a bond effective between materials with differing coefficients of thermal expansion.

BRIEF DESCRIPTION OF THE DRAWINGS

Other objects, advantages, and novel features of the present invention will be apparent from the following detailed description when considered with the accompanying drawings wherein the thicknesses of depicted layers are exaggerated for illustrative purposes:

FIGS. 1A–1C are sectional diagrams of successive stages in the construction of an article in accordance with the principles of the present invention, FIG. 1A showing a layer depicted with section lining for refractory material and disposed on a planar mandrel also depicted as a refractory material; the mandrel and layer being juxtapositioned to a planar substrate depicted with lining for transparent material and bearing a sol-gel layer depicted with lining for liquid, FIG. 1B showing the refractory layer and mandrel of FIG. 1A assembled to the substrate by bonding by the sol-gel layer which is solidified as represented by lining for transparent material, and FIG. 1C showing the article as formed from the assembly of FIG. 1B by removal of the mandrel;

FIG. 2, which corresponds to the stage of FIG. 1A, shows a portion of a conceptual integrated circuit, which is depicted at a greatly enlarged scale and with lining and stippling for semiconductor material and which bears a layer of sol-gel solution, and FIG. 2 shows a portion of a mandrel conforming to the integrated circuit portion and bearing a refractory layer deposited thereon in conforming relation thereto, the layers being juxtapositioned for assembly of the mandrel portion and its layer to the integrated circuit by sol-gel bonding as in FIG. 1B;

FIG. 3, which also corresponds to the stage of FIG. 1A, shows an arcuate, freestanding element, which corresponds to the refractory layer of FIG. 1 and may be similarly formed by deposition on a mandrel, juxtapositioned to a conforming substrate bearing a sol-gel layer for assembly of the element to the substrate as in FIG. 1B.

DETAILED DESCRIPTION

Figure 4B:
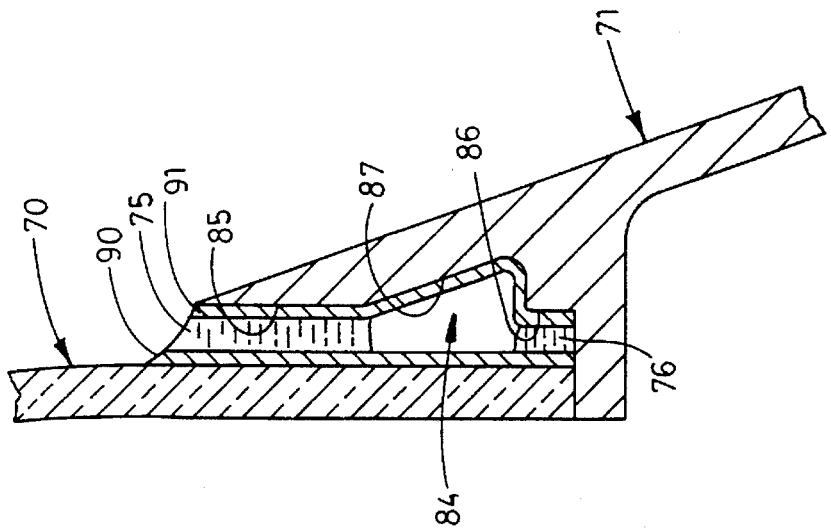
FIGS. 4A and 4B show a dome-like window and a fragmentarily represented fuselage assembled in accordance with the principles of the present invention; the window, which is represented with lining for transparent material and may be diamond, being fixed to the fuselage, which is depicted with lining for metal in FIG. 4B, in a region which is indicated in FIG. 4A by a dash line circle and which is represented in section and at an enlarged scale in FIG. 4B to show metal layers deposited on the window and on the fuselage and bonded by a solidified sol-gel layer.

FIG. 1A, which represents a stage in sol-gel bonding in accordance with the present invention as described in Examples I–V below, shows a coating or layer 10. Layer 10 is formed of any suitable material which is sometimes referred to in the claims as a "first material" and which, in a particularly advantageous use of the invention, may be a refractory material such as polycrystalline diamond formed in a well-know manner by chemical vapor deposition from an activated plasma at a temperature of over 800° C. and up to 1100° C. Layer 10 has a surface 11 which is represented as having the irregularities of such a surface left when such deposition is discontinued. Layer 10 is to be mounted, see FIGS. 1B and 1C, as a coating on surface 14 of a substrate 15 which may be a portion of a more extensive article provided with the layer.

Substrate 15 is constructed of any suitable material which is sometimes referred to in the claims as a "second material" and which may be a material, such as the infrared transmissive materials zinc sulfide and zinc selenide, damaged or destroyed by the above-mentioned chemical vapor deposition temperature. However in the practice of the present invention, layer 10 is deposited, as by such chemical vapor deposition, on a mandrel 17 which is constructed of any suitable material, sometimes referred to in the claims as a "third material" and which may be a refractory material, such as silicon, undamaged during such deposition. Mandrel 17 is disposed oppositely of layer 10 from its surface 11 with layer 10 being deposited on a surface or surface portion 18 of the mandrel, typically when the mandrel is at a location remote from the substrate.

Surface 18 is represented as being regular and is, typically, formed by polishing so that the layer 10 has, at mandrel surface 18, a surface 19 which is smooth and regular and at which the deposition of layer 10 began. In FIGS. 1A–1C, mandrel surface 18, layer surface 11, and substrate surface 14 are all substantially planar and thus conforming. Surface 11 is planar since it was generated by the step of deposition on mandrel 17 which, typically, was previously constructed so as to provide its planar surface 18. However, conforming surfaces utilized in the practice of the present invention may have various other and even arbitrary shapes, see FIGS. 2 and 3 for examples, and such surfaces, as in FIG. 4, need not have their conforming shapes generated by deposition on a mandrel and the like.

In FIG. 1A, a layer 25 of any suitable sol or sol-gel solution is shown applied to substrate surface 14. Suitable sol-gel materials are identified below, and the preparation of suitable sol-gel solutions from various sol-gel precursors using conventional and fully effective materials and procedures are set forth in detail in the examples below. It will be apparent that, for the purposes of the present invention, the sol-gel solution may be applied to a surface corresponding to surface 11 instead of to a surface corresponding to surface 14, or the solution may be applied to both such surfaces. At the stage represented in FIG. 1A, the solution is, typically, a viscous liquid; and surface 11 of layer 10 and surface 14 are disposed in facing relation so that these surfaces may be urged together in any suitable manner into juxtapositioned relation with solution 14 entirely contacting both of the surfaces so that the solution subsequently forms a sol-gel at the region indicated by numeral 26 in FIG. 1B with the sol-gel filling in the irregularities of surface 11.

The sol-gel forms at the region 26 in a manner usual in the sol-gel art and in contact with and extending between the surfaces 10 and 14. The sol-gel is then sintered in any suitable manner, which may be conventional in this art, to form a bonding material in the region 26. This bonding material, which is sometimes referred to in the claims as a "fourth material", is disposed as layer, indicated by numeral 27 in FIG. 1C, attached to surfaces 10 and 14 so as to bond layer 10 to substrate 15. Such sintering, as in Example V below for bonding a layer of diamond to a substrate of zinc sulfide using a sol-gel solution based on the well-known silica sol-gel precursor tetraethyl orthosilicate, may advantageously be performed at a temperature of about 300° C. which does not damage the zinc sulfide.

In the practice of the present invention, the above-identified silica forming sol-gel precursor tetraethyl orthosilicate (TEOS) and the titania forming sol-gel precursor tetraisopropyl titanate have been effective as shown in the following examples for the formation of a bonding layer such as layer 10. However, it is believed that other sol-gel precursors, of which many, such as silicon oxynitrides for the formation of such a bonding layer of silica, are well-known and are equally effective. For examples, sol-gel precursors including a hafnium compound, so that the bonding material includes $HfO_2$; a yttrium compound, so that the bonding material includes $YO_2$; or an aluminum compound, so that the bonding material includes $Al_2O_3$, are believed effective as providing such a bonding material of various glasses effective in the optical art.

The present sol-gel bonding invention is believed effective for bonding a wide variety of materials corresponding to those used to construct the elements identified by numerals 10 and 15. These materials include, but are not limited to, those used in the optical art. The invention, as set forth in the following examples, is effective with glasses, such as fused silicon, crystalline materials such as diamond, metaloids such as silicon, and metals such as chromium. However, it is believed that the invention is effective with other glasses, crystalline materials, metalloids, and metals as well as ceramics. When used to bond the carbon allotrope diamond, sol-gels including the carbide forming elements silicon and titanium have been effective when sintered at a temperature of about 300° C. It is believed that this effectiveness is, at least to some extent, due to bonds formed between the diamond and the carbide forming element even at this relatively low temperature and that other carbide forming elements, as well as silicide forming elements, are effective for sol-gel bonding to diamond in accordance with the present invention.

After formation of the sol-gel in region 26 and, preferably, after sintering the sol-gel to form the bonding material indicated in region 27, mandrel 17 may be removed in any suitable manner, as by etching with an acid solution described in Example I below which attacks the mandrel material but does not affect the material of layer 10, to form an article such as that shown in FIG. 1C having surface 19 of layer 10 exposed while this layer remains bonded to substrate 15 for purposes such as protection of the substrate from the environment, enhanced thermal conduction from the substrate, and reflection control.

FIG. 2 shows a stage, which corresponds to that of FIG. 1A, in the mounting of a fragmentarily represented protective layer 40, as of diamond material, on a conceptually represented integrated circuit portion 42 having an irregular and arbitrary surface shape and covered with a layer of sol-gel solution 44 which, because of its viscous nature, adheres to the irregularities of the circuit portion 42. Layer 40 has been formed, as by chemical vapor deposition, on a mandrel 46 conforming to these irregularities so that layer 40 has irregularities conforming to those of circuit portion 42. As a result layer 40 may be pressed into contact with solution 44 followed, as set forth above, by sol-gel formation and sintering to bond layer 40 to circuit portion 44 and by removal of mandrel 46. This sintering, as before stated, may be at a temperature not exceeding 300° C. and thus not damaging to semiconductor materials.

FIG. 3 shows a stage, which also corresponds to that of FIG. 1A, in the mounting of a dome-like layer 50 on a optical article 52 such as a lens or window having a conventional convex spherical surface 53 to which has been applied a layer of sol-gel solution 55 and to which the concave side of layer 50 conforms. Layer 50 may be formed by chemical vapor deposition on a mandrel, not shown, which conforms to surface 53 and from which the layer is separated by etching as described above or by difference in thermal expansion between the layer and mandrel. However layer 50 may be formed in any other suitable manner as by conventional optical machining or grinding procedures. After the stage of FIG. 3, layer 50 is bonded to surface 53 by pressing and sol-gel procedures such as those described above and in the following examples.

The present invention is advantageously used to bond a first element, typified by elements 10 and 50 of FIG. 1C and FIG. 3 respectively, to a second element, typified by elements 15 and 53 of these figures, where the first and second elements are constructed of materials having indices of refraction that are important, as when the elements are elements of an article for optical use. In such an article the index of refraction of the bonding layer, typified by layer 27 and by layer 52 after gelation and sintering, is typically desired to have a particular value for a purpose such as reflection control, and this value may be determined by selection of the composition of the sol-gel solution which will form the bonding layer.

For example, the bonding layer index may be determined by selected a sol-gel precursor resulting in a bonding layer having substantially the same index of refraction as one of the elements, as by the use of a titania sol-gel precursor for such an element constructed of diamond.

However, the composition of the sol-gel solution may be selected to provide a bonding layer index anywhere in a range of refractive indices. This may be achieved by varying the amount of water in the sol-gel solution, thereby determining the porosity of the resulting sol-gel and of the bonding material derived therefrom. In this way, the bonding layer index may be varied through a range from about 1.00 to about that of the pure, non-porus bonding material. The composition may also be selected by varying the proportions of two different sol-gel precursors in the sol-gel solution, such as a silica precursor and a titania precursor, to vary the bonding layer index through a range between the indices of the two pure sol-gel derived materials formed from the different precursors.

Figure 4A:
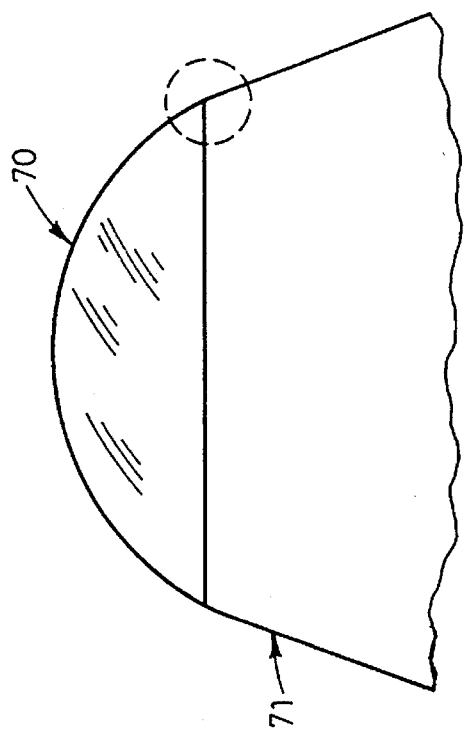

FIG. 4A shows a dome-like window 70 and a fragmentarily represented fuselage 71 which have been assembled by sol-gel bonding in accordance with the principles of the present invention, particularly as described in Example VI below, by sol-gel derived bonding layers 75 and 76 which are shown in FIG. 4B and are of annular configuration. While the window and fuselage may be constructed in any suitable manner and of any suitable materials, the present invention may be advantageously used to mount a window constructed of diamond on a fuselage constructed from a metal such as aluminum.

As shown in FIG. 4B, window 70 has a cylindrical open end portion 80 received in a socket 84 of fuselage 71. Socket 84 is configured to receive a window having the general external configuration of window 70 but constructed of material which may be mounted to the metal of fuselage 71 by conventional metal brazing. However, such brazing is not effective with such a window constructed of a material damaged by the temperature of such brazing and is not effective with diamond, to which conventional brazing materials do not adhere.

Socket 80 has coaxially related cylindrical surfaces 85 and 86 of the same diameter. Surface 85, which is depicted as uppermost in FIG. 4B, is spaced from surface 86 by a groove 87 of triangular cross section. Dome portion 80 is constructed to conform to these surfaces, but is somewhat smaller in diameter and is fitted therein with surfaces 85 and 86, respectively, circumscribing bonding layers 75 and 76.

Relative coefficients of thermal expansion for materials utilized in the FIGS. 4A and 4B structure are: diamond, about 1.0–2.0; the typical sol-gel derived bonding material silica, about 0.5–1.0; and aluminum, about 14.0. Therefore, layers 90 and 91 of a material having an intermediate thermal expansion are provided, directly and respectively, on the exterior of dome portion 80 and within socket 84 and thus on each of the opposite sides of the bonding layers 75 and 76. In view of Example VI below, the metal chromium, which has a relative thermal expansion of about 7.0 and may be easily deposited by sputtering and will adhere somewhat to diamond when deposited in a layer as thin as about 50 Å, is effective as a layer providing a graded coefficient of thermal expansion between diamond, silica, and aluminum. It is believed that a layer disposed as are layers 90 and 91 and as thin as about 50 Å is not continuous so that sol-gel derived bonding material, as of layers 75 and 76, directly contacts the bonded materials, such as those of both window 70 and fuselage 71, via voids in the layer.

EXAMPLES

In the following examples polycrystalline diamond films, each corresponding to a FIG. 1A layer 10, were grown on single crystal silicon wafers of 10 mil (about 0.25 mm) thickness, each wafer corresponding to a mandrel 17 of FIG. 1A. The films were grown to a thickness of about 5–6 microns by conventional microwave-assisted chemical vapor deposition at a wafer temperature of about 850° C. from a hydrogen, methane, and oxygen plasma.

The sols using tetraethyl orthosilicate (TEOS) were prepared in a conventional manner by mixing 44.5 ml of TEOS, 44.5 ml of ethyl alcohol, deionized water, and hydrochloric acid as a catalyst. The TEOS and one-half of the alcohol were mixed as a first solution under rigorous stirring for 20 minutes. A second solution was made by mixing the other one-half of the alcohol and the water and its pH was adjusted to 1.6 with the hydrochloric acid. The second solution was then added drop-by-drop to the first solution while stirring, and the resulting sol was sealed in a propylene bottle for aging at room temperature to select the viscosity of the sol.

In accordance with the present invention, the diamond films were then attached to 1.0 inch (about 25 mm) diameter fused silica glass substrates each corresponding to a substrate 15 of FIG. 1A. The substrates were first ultrasonically cleaned in acetone for 15 minutes, rinsed with deionized water, mildly leached with a 1N hydrochloric acid solution, again rinsed with deionized water, oven dried at 60° C., and stored in clean petri dishes.

A fused silica glass substrate was covered by three to four drops of the sol-gel solution and, using a well-known Carver press with heatable jaws, applying a pressure of approximately 50 psi, a polycrystalline diamond film, which was disposed on its silicon wafer, was pressed to the sol-gel solution covered substrate to form a sandwich corresponding to that represented in FIG. 1B. The sandwich was left at this pressure and at room temperature for several hours before raising its temperature to about 300° C. at a rate of about 1° C. per minute. The sandwich was left at this temperature for several hours and then allowed to cool slowly to room temperature.

The silicon wafer was then etched away using a hydrogen fluoride/nitric acid/acetic acid (5:1:1) solution. This etching resulted in a smooth diamond film, which corresponds to layer 10 as shown in FIG. 1C with surface 19 exposed, bonded to the fused silica substrate by a sol-gel derived silica bonding layer corresponding to layer 27 of FIG. 1C.

Example I

A silica bonding layer derived from a water/TEOS sol-gel solution as described above having 7.2 ml of deionized water giving a 2.0/1.0 molal ratio of water/TEOS was utilized, after aging for 24 hours, to effectively and completely bond a diamond film to such a silica glass wafer by such a silica bonding layer.

Example II

Example II was carried out substantially as in Example I except that the amount of water in the sol-gel solution was increased to 36.0 ml giving a 10.0/1.0 molal ratio of water/TEOS. The diamond film was again effectively and completely bonded to the silica glass.

Example III

Example II was carried out substantially as in Example I except that the sol was allowed to age for 48 hours. The diamond film was again effectively and completely bonded to the silica glass.

Example IV

Example IV was carried out substantially as in Example I except that the sol-gel solution was prepared using tetraisopropyl titanate instead of tetraethyl orthosilicate. The diamond film was again effectively bonded to the silica glass wafer although there were small cracks on the edge of the wafer.

Example V

Example V was carried out generally as in Example I. However, a substrate of the infrared transmissive material zinc sulfide was used instead of a silica glass wafer. This zinc sulfide substrate was 1.0 inch (about 25 mm) in diameter and 0.125 inch (about 3 mm) in thickness and was given a coating, at its surface corresponding to FIG. 1A surface 14, of 100–250 Å of silica by reactive radio frequency diode sputtering to ensure good adhesion of the sol-gel. Example V also differed from Example I in that the amount of water in the sol-gel solution was increased to 36.0 ml giving a 10.0/1.0 molal ratio of water/TEOS as in Example II.

The diamond film was effectively bonded to the zinc sulfide substrate although, when the silicon wafer was etched away to expose the diamond layer, cracks developed in the sol-gel derived silica bonding layer disposed between the diamond film and the zinc sulfide substrate.

Example VI

Example VI was carried out generally as in Example I. However, a disk of type 6021 aluminum alloy having a diameter of 1.0 inch (about 25 mm) and a thickness of 0.125 inch (about 3 mm) was used instead of a silica glass substrate. Example VI also differed from Example I in that the diamond film surface and the aluminum disk surface, which correspond respectively to surfaces 11 and 14 of FIG. 1A, were each coated by DC magnetron sputtering with a layer of chromium metal of about 500 Å in thickness. Before this coating, the aluminum disk was first cleaned with "Micro Cleaning Solution", catalog number G-08790, supplied by Cole-Parmer Instrument Co. of Chicago, Ill., and deionized water, and the disk was then cleaned with acetone and methanol.

Three drops of the sol-gel solution were applied to each of the chromium sputtered surfaces, and these surfaces were then pressed together and heating and etching operations carried out as in Example 1. The diamond film was completely and effectively bonded to the aluminum disk by the resulting silica bonding layer, and temperature cycling of the resulting diamond coated aluminum article between room temperature and a temperature of about 650° C. did not cause delamination or cracking of the diamond layer or of the bonding layer.

Obviously, many modifications and variations of the present invention are possible in light of the above teachings. It is, therefore, to be understood that the present invention may be practiced within the scope of the following claims other than as described herein.

What is claimed is:

1. A method of constructing an article, the method comprising bonding a preexisting first surface formed of a predetermined material to a preexisting second surface substantially conforming to the first surface by the steps of:

constructing a mandrel having a surface portion substantially conforming to said first surface;

depositing a coating on said surface portion of said mandrel so that said second surface is formed on said coating oppositely of said mandrel;

preparing a solution containing a precursor for a sol-gel, said sol-gel being sinterable without damage to said predetermined material to form a bonding material attached to said surfaces when said sol-gel is sintered in contact with said surfaces;

applying said solution to at least one of said surfaces;

juxtapositioning said surfaces so that said solution contacts both of said surfaces with subsequent formation of said sol-gel between said surfaces;

sintering said sol-gel so that said sol-gel forms a layer of said bonding material bonding said surfaces together; and removing said mandrel from said coating subsequent to said formation of said sol-gel.

2. The method of claim 1 wherein the step of removing said mandrel is performed:

subsequent to said step of sintering said sol-gel; and with said bonding material bonding said surfaces together.

3. A method of constructing an article, the method comprising bonding a preexisting first surface formed of a predetermined material to a preexisting second surface substantially conforming to the first surface by the steps of:

constructing a mandrel having a surface portion substantially conforming to said first surface;

depositing a coating on said surface portion of said mandrel so that said second surface is formed on said coating oppositely of said mandrel, said coating being deposited in a predetermined manner having conditions damaging to said predetermined material;

preparing a solution containing a precursor for a sol-gel, said sol-gel being sinterable without damage to said predetermined material to form a bonding material attached to said surfaces when said sol-gel is sintered in contact with said surfaces;

applying said solution to at least one of said surfaces;

juxtapositioning said surfaces so that said solution contacts both of said surfaces with subsequent formation of said sol-gel between said surfaces; and sintering said sol-gel so that said sol-gel forms a layer of said bonding material bonding said surfaces together.

4. The method of claim 3 wherein said coating is diamond and said predetermined manner is chemical vapor deposition of said diamond on said surface portion of said mandrel.

5. The method of claim 4 wherein said surface portion has a temperature of at least about 800° C. during said chemical vapor deposition.

6. The method of claim 5 wherein said sintering of said sol-gel is at a temperature of about 300° C.

7. A method of constructing an article, the method comprising bonding a preexisting first surface formed of a predetermined material to a preexisting second surface substantially conforming to the first surface and formed of diamond by the steps of:

preparing a solution containing a precursor for a sol-gel, said sol-gel being sinterable without damage to said predetermined material to form a bonding material attached to said surfaces when said sol-gel is sintered in contact with said surfaces;

applying said solution to at least one of said surfaces;

juxtapositioning said surfaces so that said solution contacts both of said surfaces with subsequent formation of said sol-gel between said surfaces; and sintering said sol-gel so that said sol-gel forms a layer of said bonding material bonding said surfaces together.

8. The method of claim 7 wherein said precursor for a sol-gel is a compound of a carbide forming element.

9. The method of claim 8 wherein said sintering of said sol-gel is at a temperature of at least about 300° C.

10. The method of claim 7 wherein said precursor for a sol-gel is chosen from a group consisting of silicon compounds, so that said bonding material includes silica, and titanium compounds, so that said bonding material includes titania.

11. The method of claim 7 wherein said precursor for a sol-gel is chosen from a group consisting of a silicon compound, so that said bonding material includes $SiO_2$; a titanium compound, so that said bonding material includes $TiO_2$; a hafnium compound, so that said bonding material includes $HfO_2$; a yttrium compound, so that said bonding material includes $YO_2$; and an aluminum compound, so that said bonding material includes $Al_2O_3$.

12. A method of constructing an article from a preexisting first surface formed of a first predetermined material and from a preexisting second surface formed of a second predetermined material and substantially conforming to the first surface, said first material and said second material having respective and predetermined indices of refraction, and the method comprising bonding said surfaces by the steps of:

preparing a solution containing a precursor for a sol-gel, said sol-gel being sinterable without damage to said predetermined material to form a layer of bonding material attached to said surfaces when said sol-gel is sintered in contact with said surfaces, it being desired that said layer of said bonding material have a predetermined index of refraction relative to said indices of refraction, and said solution having a composition selected so that said bonding material has said predetermined index of refraction;

applying said solution to at least one of said surfaces;

juxtapositioning said surfaces so that said solution contacts both of said surfaces with subsequent formation of said sol-gel between said surfaces; and sintering said sol-gel so that said sol-gel forms a layer of said bonding material having said predetermined index of refraction and bonding said surfaces together.

13. The method of claim 12 further comprising applying said solution so that said solution substantially entirely contacts said surfaces in the step of juxtapositioning said surfaces.

14. The method of claim 12 wherein said precursor is one precursor of a plurality of sol-gel precursors in said solution, and wherein selecting said composition includes varying the proportions of said precursors in said solution.

15. The method of claim 12 wherein said index of refraction varies with porosity of said sol-gel, and wherein said selecting said composition includes varying said composition to determine said porosity.

16. The method of claim 12 further comprising forming said second surface by the steps of:

constructing a mandrel having a surface portion substantially conforming to said first surface; and depositing a coating on said surface portion of said mandrel so that said second surface is formed on said coating oppositely of said mandrel, said coating being deposited in a predetermined manner having conditions damaging to said predetermined material.

17. A method of constructing an article from a preexisting first surface formed of a first predetermined material and from a preexisting second surface formed of a second predetermined material and substantially conforming to the first surface, said first material and said second material each being selected from a group consisting of glasses, ceramics, and metals and at least one of said predetermined materials being a metal deposited by sputtering, the method comprising bonding said surfaces by the steps of:

preparing a solution containing a precursor for a sol-gel, said sol-gel being sinterable without damage to said predetermined material to form a bonding material attached to said surfaces when said sol-gel is sintered in contact with said surfaces;

applying said solution to at least one of said surfaces;

juxapositioning said surfaces so that said solution contacts both of said surfaces with subsequent formation of said sol-gel between said surfaces; and sintering said sol-gel so that said sol-gel forms a layer of said bonding material bonding said surfaces together.

18. The method of claim 17 wherein said metal is chromium.

19. A method of providing a coating of a first material for a surface portion of an article, said surface portion having a predetermined shape and being constructed of a second material damageable by deposition of said first material in a predetermined manner, the method comprising:

constructing a mandrel having a surface portion conforming to said shape, said mandrel being constructed from a third material undamaged by deposition of said first material on said third material in said predetermined manner;

depositing said coating on said mandrel in said predetermined manner;

preparing a solution containing a precursor for a sol-gel, said sol-gel being sinterable without damage to said first material and said second material to form a fourth material which bonds to said first material and to said second material when said sol-gel is sintered in contact with said first material and said second material;

applying said solution to at least one of said surface portions;

urging said mandrel and said article together so that said solution contacts both of said surface portions and said sol-gel forms from said precursor and between said surface portions;

sintering said sol-gel so that said sol-gel forms a layer of said fourth material extending between and in bonding relation to said surface portions; and removing said third material from said first material so that said first material remains in bonded relation to said surface portion of said article as said coating.

20. The method of claim 19 wherein the method further comprises depositing said coating on said mandrel in said predetermined manner when said mandrel is at a location remote from said surface portion of said article.

21. The method of claim 19 wherein:

said first material is polycrystalline diamond;

said second material is chosen from a group consisting of zinc sulfide and zinc selenide;

said predetermined manner is chemical vapor deposition from an activated plasma;

said third material is silicon;

said precursor for a sol-gel is chosen from a group consisting of a silicon compound, so that said fourth material includes silica, and a titanium compound, so that said fourth material includes titania;

said sol-gel is sintered at a temperature of about 300° C.; and said third material is removed by etching with an acid solution.

22. The method of claim 21 wherein said silicon compound is chosen from a group consisting of tetraethyl orthosilicate and silicon oxynitrides.

23. The method of claim 21 wherein said titanium compound is tetraisopropyl titanate.

* * * * *